(12) United States Patent  (10) Patent No.: US 7,669,622 B2
Liao  (45) Date of Patent: Mar. 2, 2010

(54) JOINTER/PLANER WITH INTERNAL SAWDUST COLLECTION SYSTEM

(76) Inventor: Chih Hung Liao, No. 396 Yong Ming Street, Ta Li City, Taichung (TW)

( * ) Notice: Subject to any disclaimer, the term of this patent is extended or adjusted under 35 U.S.C. 154(b) by 312 days.

(21) Appl. No.: 11/871,564

(22) Filed: Oct. 12, 2007

(65) Prior Publication Data

US 2009/0095374 A1    Apr. 16, 2009

(51) Int. Cl.
*B27G 19/00*    (2006.01)
(52) U.S. Cl. ............... 144/252.1; 144/117.1; 144/286.5
(58) Field of Classification Search ............. 144/114.1, 144/117.1, 252.1, 252.2, 286.1, 286.5; 409/137; 408/67; 83/100; 451/453, 456
See application file for complete search history.

(56) References Cited

U.S. PATENT DOCUMENTS

| | | | |
|---|---|---|---|
| 6,382,278 B1 * | 5/2002 | Liao et al. | ........... 144/252.1 |
| 6,478,060 B1 | 11/2002 | Liao | |
| 6,481,473 B2 | 11/2002 | Liao et al. | |
| 6,481,474 B1 * | 11/2002 | Liao et al. | ........... 144/252.1 |
| D471,569 S | 3/2003 | Wang | |
| D477,002 S | 7/2003 | Wang | |
| 6,712,106 B1 | 3/2004 | Wang | |
| D488,173 S | 4/2004 | Wang | |
| 6,749,492 B2 | 6/2004 | Chiang | |
| 6,789,588 B2 | 9/2004 | Liao et al. | |

* cited by examiner

*Primary Examiner*—Shelley Self
(74) *Attorney, Agent, or Firm*—Greer, Burns & Crain, Ltd.

(57) ABSTRACT

A jointer/planer with an internal sawdust collection system, includes a machine frame having a board inlet end and a board outlet end, a rotating cutter mounted to the frame for rotation in an axis located transverse to a board feed direction, a dust collector hood disposable on the frame in a first position for jointing, and a second position for planning, a dust collecting impeller disposed in an impeller housing on the frame, a conduit having a first end in communication with the hood and a second end in communication with the impeller housing regardless of being in the first position or the second position, and a power source associated with the frame and constructed and arranged for powering the cutter and the impeller.

16 Claims, 6 Drawing Sheets

JOINTER/PLANER WITH INTERNAL SAWDUST COLLECTION SYSTEM

BACKGROUND OF THE INVENTION

The present application relates to powered woodworking machines, such as jointer/planers, and specifically to such machines having associated sawdust collection systems.

In woodworking, jointers are used for providing a square or level edge to boards, and also for gradually reducing the thickness of stock wood to desired dimensions. Jointers are used with a fixed position, rotating cutter located between two adjacent jointer beds. One of the beds is fixed relative to the cutter, and the other bed is adjustable in height relative to the other and the fixed cutter to adjust the amount of material removed with each pass of the subject board. The user places the board upon the bed and pushes it over the cutter, which works the lower edge of the wood. A fence is typically provided to create a square edge.

A planer is typically referred to as a wood leveling or reducing device used for cleaning up rough faces or creating uniform board thickness, such as leveling bowed or warped boards or otherwise reducing thickness. Planers are typically provided with a fixed position rotating cutter which works on an upper edge of a board as it is fed through the machine upon a planer bed. The bed can be raised or lowered relative to the cutter using a crank. This vertical adjustment is for regulating the thickness of the desired board after planing.

Combined jointer/planers are available, in which the same cutter is used for both jointing and planing. Such units are popular in locations where shop floor space is limited. In some units, the jointer beds are removed or moved out of the way to convert the unit from jointing to planing. In conventional jointer/planers, a dust hood is provided for collecting sawdust and wood chips. The hood is either rotatable to convert from jointing to planing, or is removably attachable to accommodate both operations. A hose from a conventional shop vacuum is connected to a port on the dust hood. Such a system is awkward in that the vacuum requires additional shop floor space, generates additional noise and requires a separate power source.

In commonly-owned U.S. Pat. No. 6,481,473 is disclosed a wood planing machine which is actually a jointer according to the above definition, having a dust collection system with a powered impeller and an external dust conduit system. The dust collection impeller is powered by the same motor as the cutter blade and creates a suction adjacent a woodworking blade which collects sawdust generated during the jointing operation. The collected sawdust and shavings are transported to a separate collection container or trash box, from which the collected material may be disposed. However the unit disclosed in the '473 patent is incapable of planing as that operation is described above.

BRIEF SUMMARY OF THE INVENTION

The present jointer/planer features a single power source, here an electric motor that powers both the cutter and the dust collection system. In the preferred embodiment, the motor drive shaft extends from opposing ends of the motor housing. One end powers the cutter and the other end powers the dust collection system. Drive belts are used to transmit power from the motor to both cutting and dust collection functions. Also, an internal conduit system is used to collect sawdust and wood chips generated during operation and transmit same to a collection point. The present unit utilizes less shop floor space and reduces shop power sources compared to conventional jointer/planers.

More specifically, a jointer/planer having an internal sawdust collection system is provided, including a machine frame having a board inlet end and a board outlet end, a rotating cutter mounted to the frame for rotation in an axis located transverse to a board feed direction, a dust collector hood disposable on the frame in a first position for jointing, and a second position for planing, a dust collecting impeller disposed in an impeller housing on the frame, a conduit having a first end in communication with the hood and a second end in communication with the impeller housing regardless of being in the first position or the second position, and a power source associated with the frame and constructed and arranged for powering the cutter and the impeller.

In another embodiment, a jointer/planer with an internal sawdust collection system is provided, including a machine frame having a board inlet end and a board outlet end, a first jointer bed disposed on the frame at the board inlet end and a second jointer bed is disposed on the frame at the board outlet end. A planer bed is disposed on the frame below the jointer beds and is vertically adjustable relative to the jointer beds. A dust collector hood is releasably mountable to the frame in a first position for planing, and a second position for jointing, the dust collector hood having an outlet connected to a first end of a conduit. An impeller chamber has an impeller and an inlet projecting through a rear side of the frame for connection to a second end of the conduit, the impeller chamber also having an impeller outlet projecting through the frame adjacent the inlet.

BRIED DESCRIPTION OF THE SEVERAL VIEWS OF THE DRAWINGS

Figure 1:
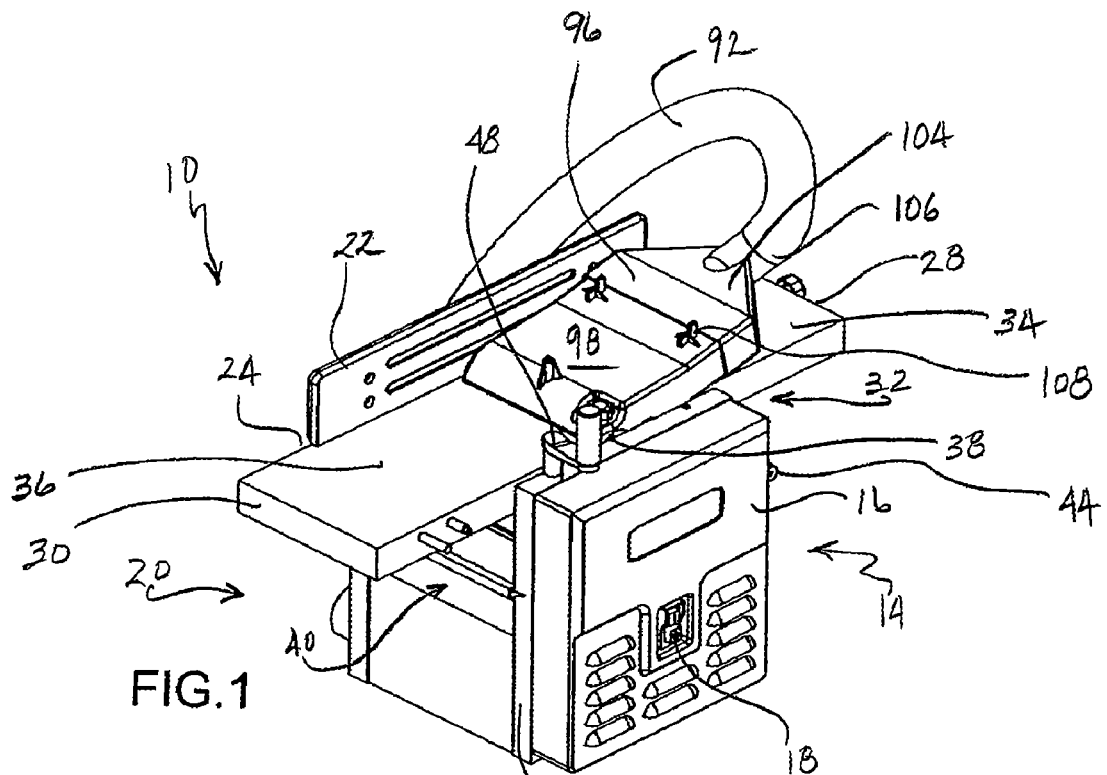
FIG. 1 is a top front perspective view of the present jointer/planer shown in the planing position.
Figure 2:
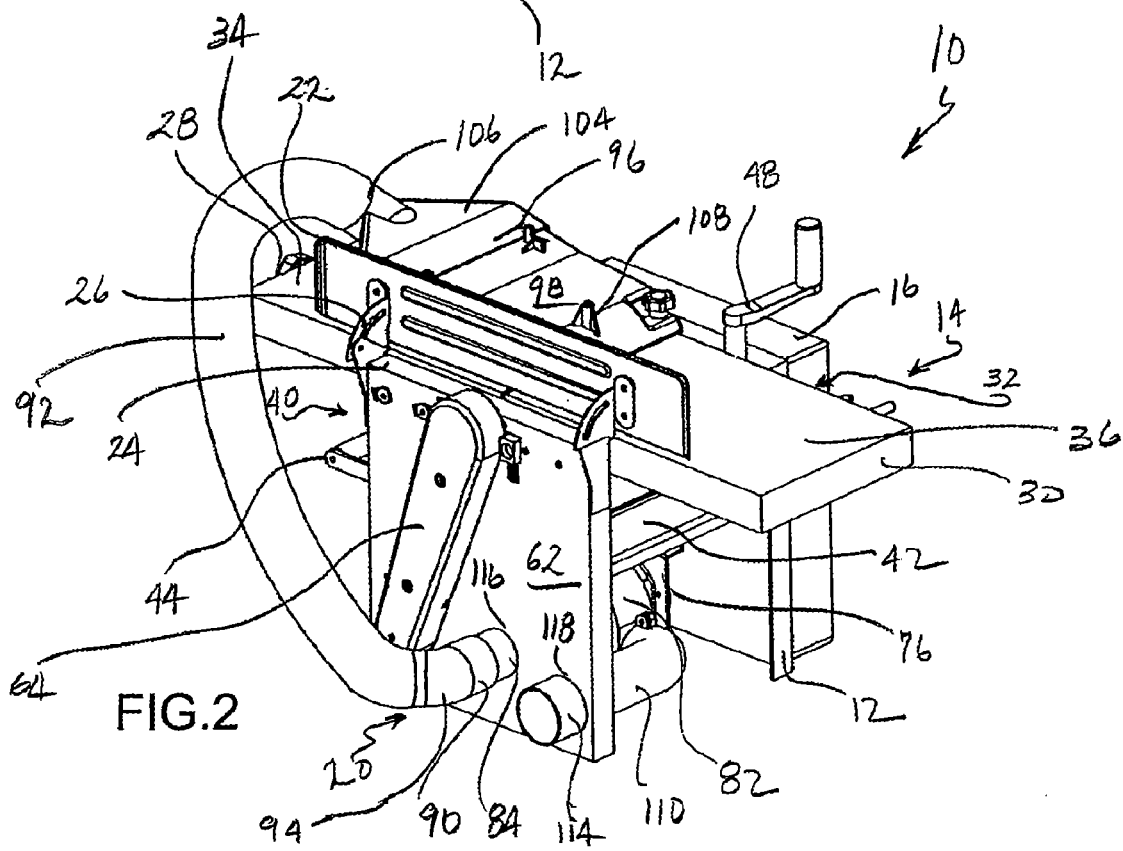
FIG. 2 is a top ;rear perspective view of the jointer/planer of FIG. 1.
Figure 3:
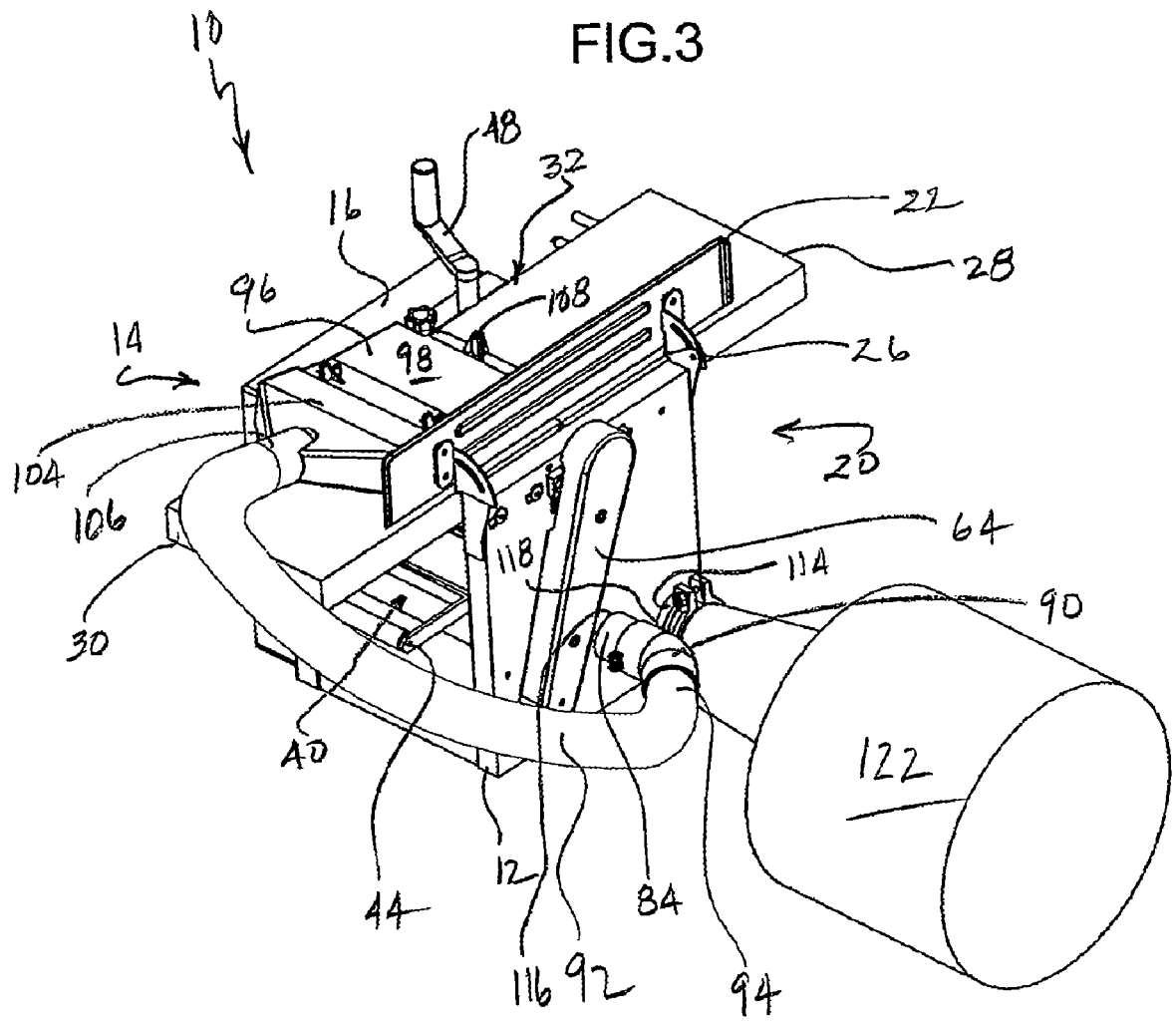
Figure 4:
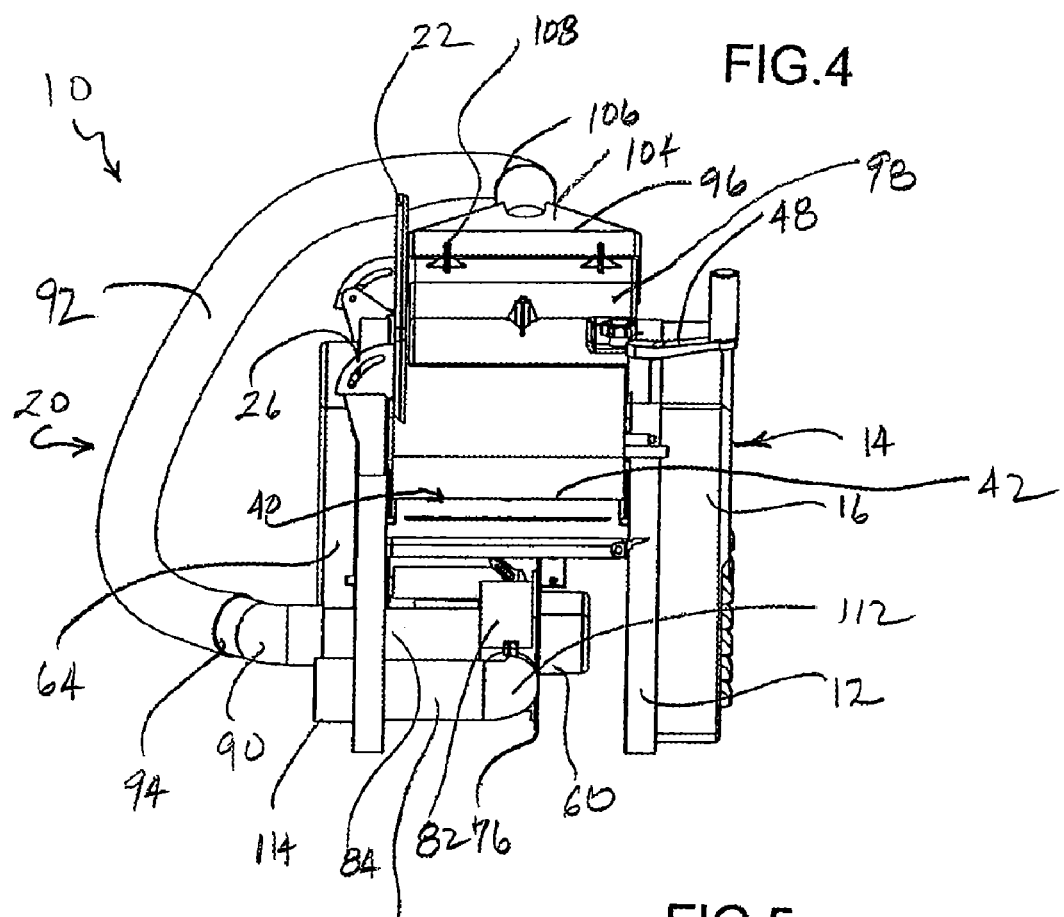
Figure 5:
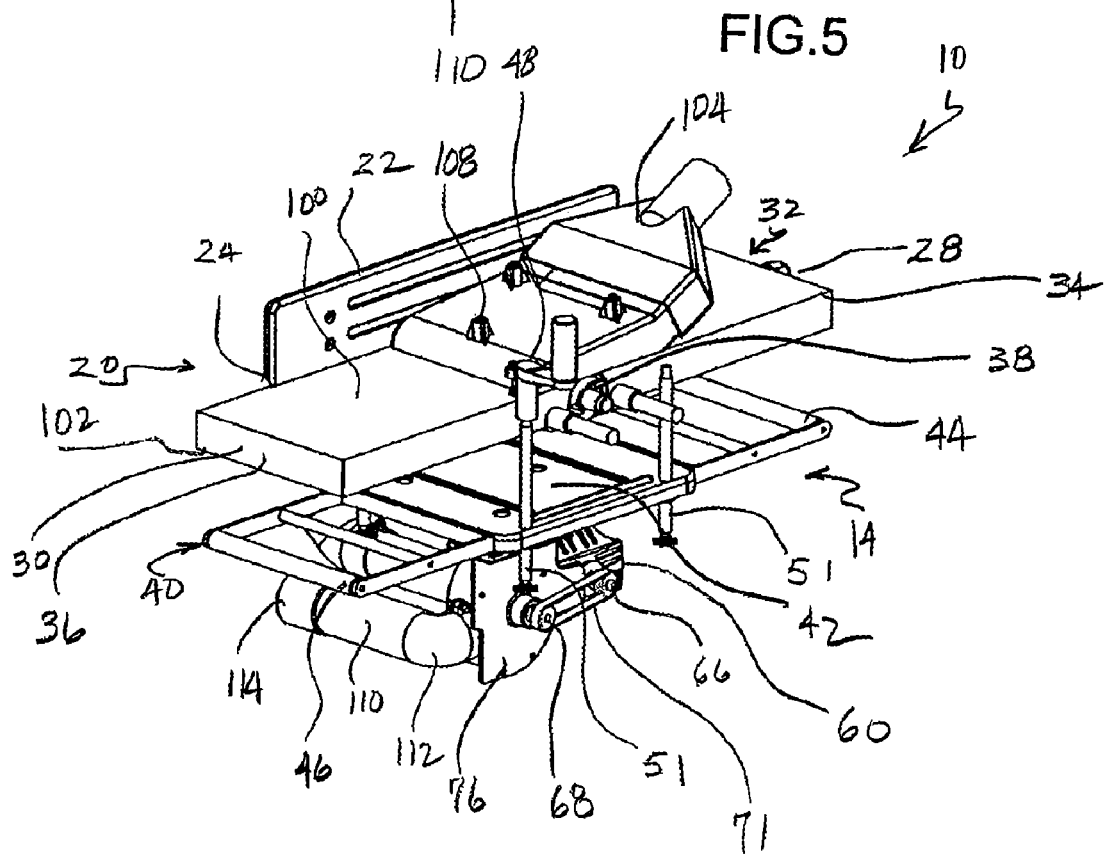
Figure 6:
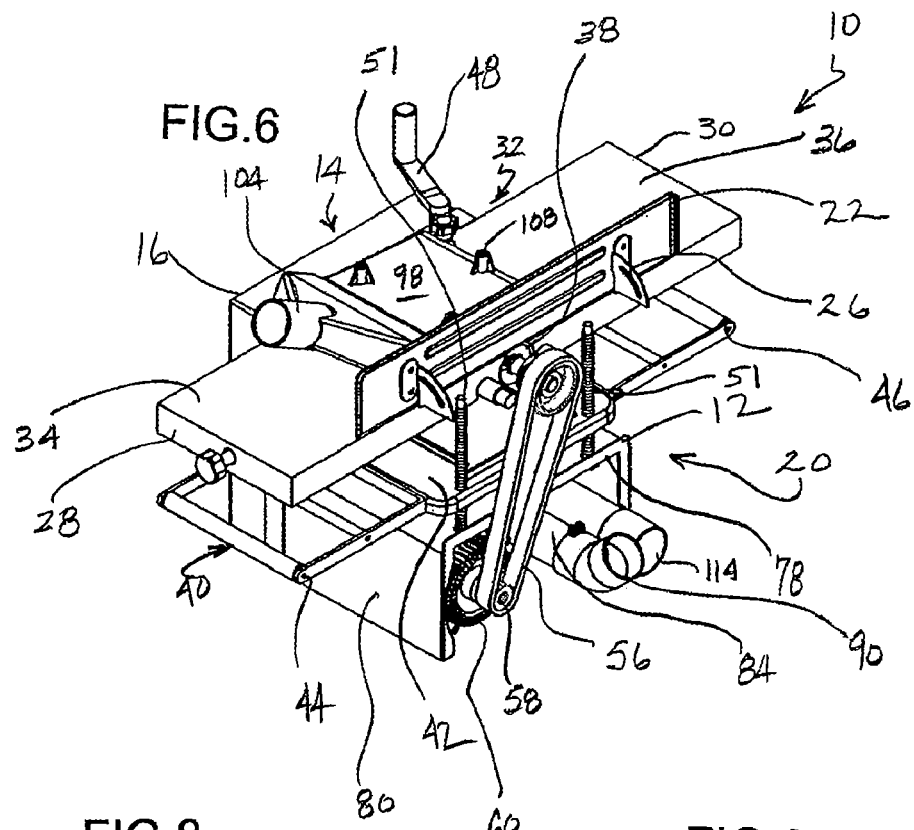
Figure 8:
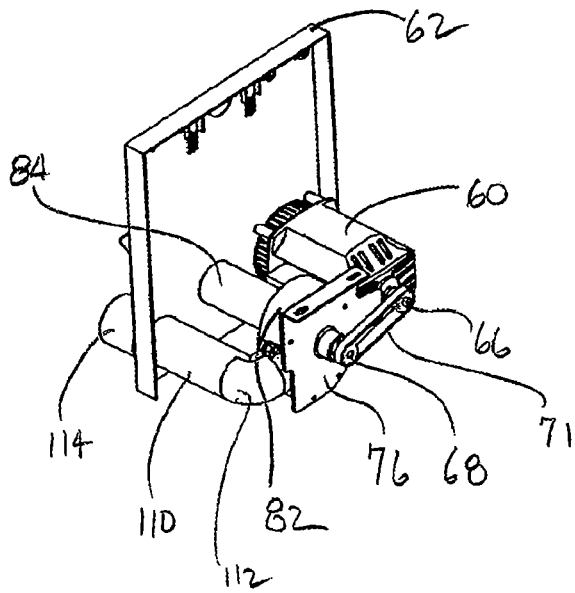
Figure 9:
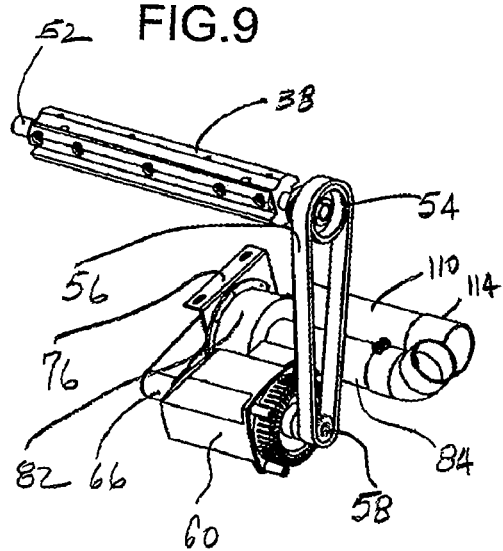
Figure 7:
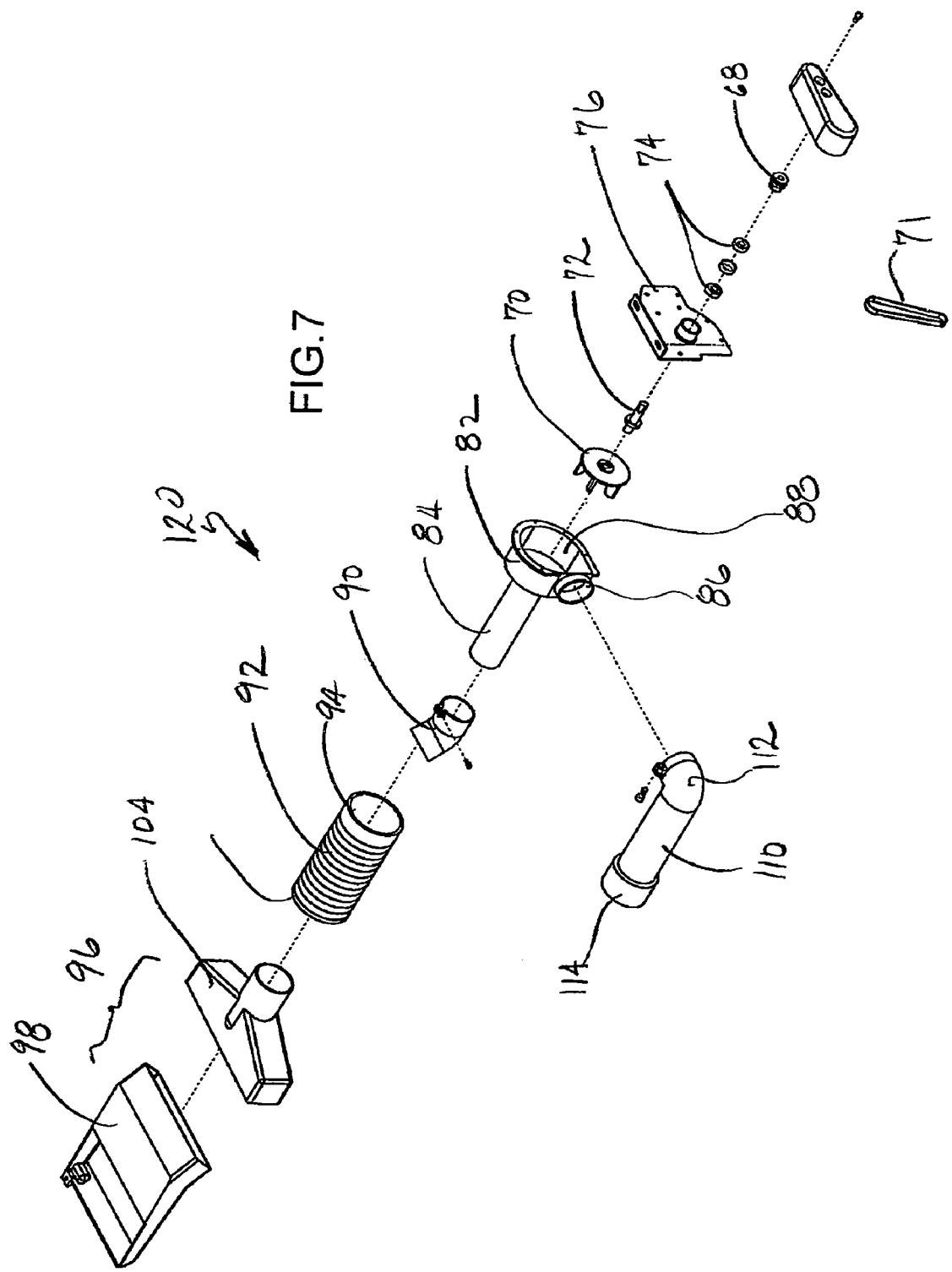
Figure 10:
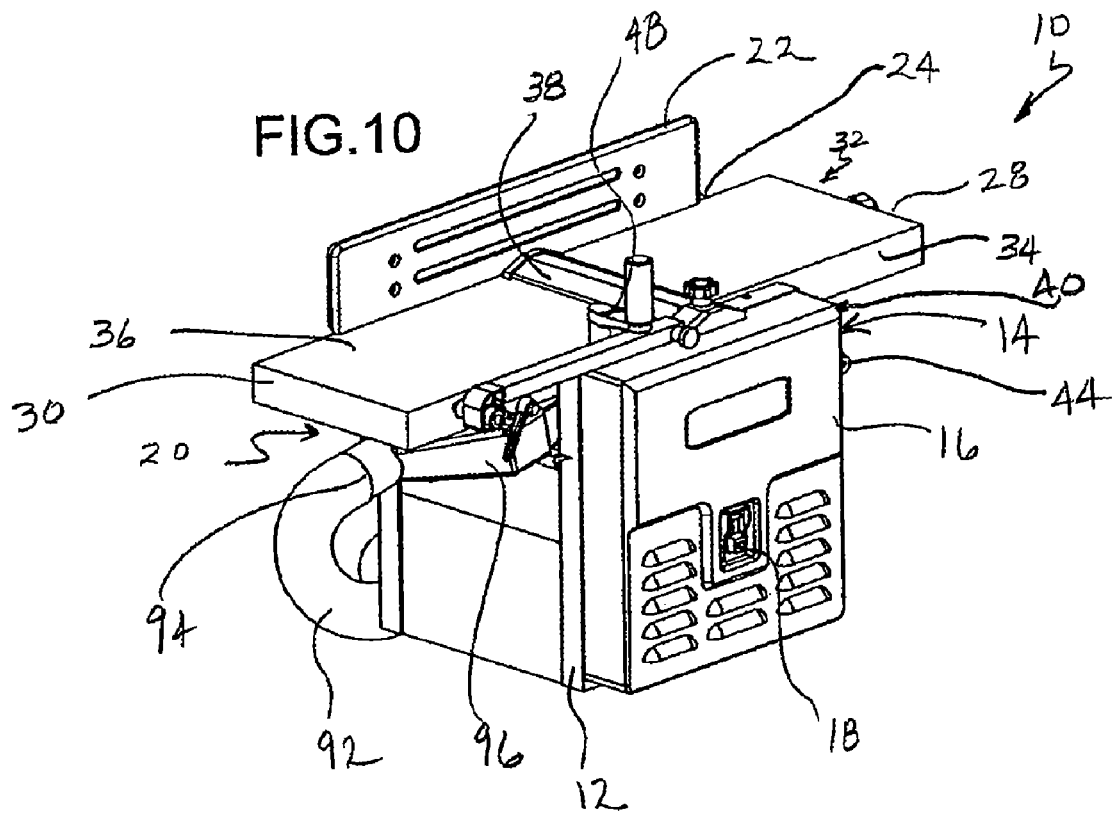
Figure 11:
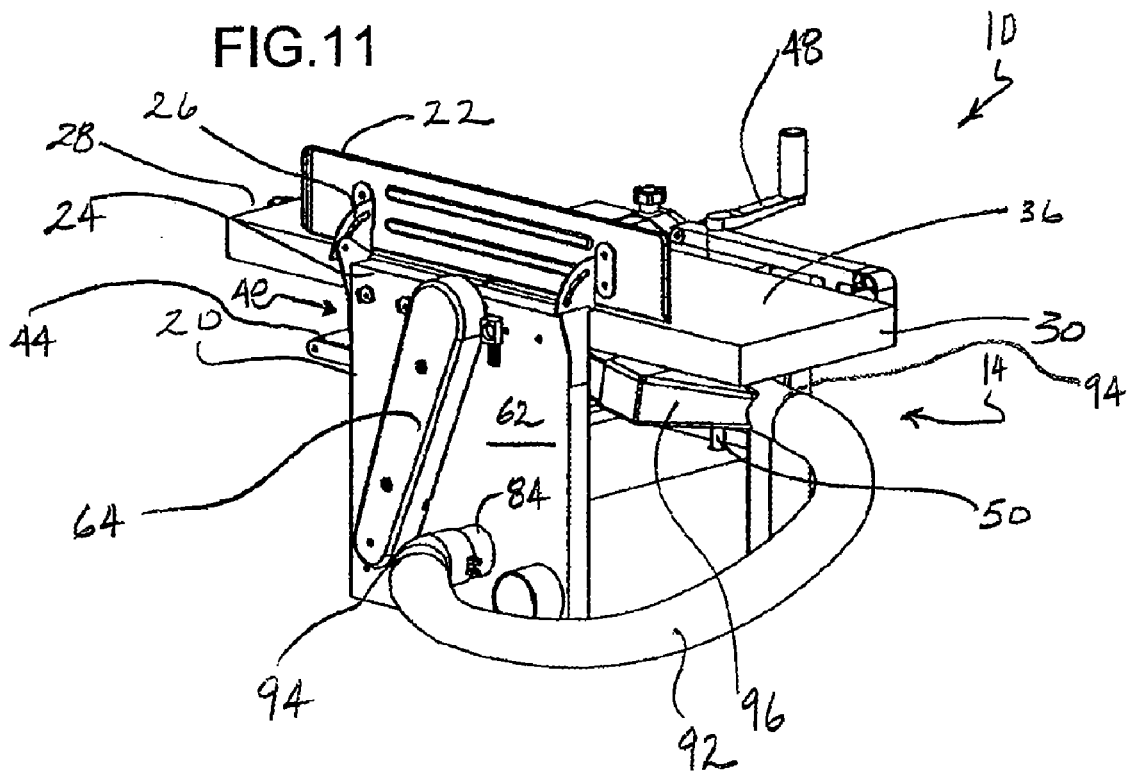

FIG. 3. is a top rear perspective of the jointer/planer of FIG. 1 shown with a dust collection container attached;

FIG. 4 is an end elevation of the present jointer/planer of FIG. 1;

FIG. 5 is a fragmentary top front perspective view of the jointer/planer of FIG. 1;

FIG. 6 is a fragmentary top rear perspective view of the jointer/planer of FIG. 2;

FIG. 7 is an exploded perspective view of the present dust collection assembly;

FIG. 8 is a fragmentary top perspective view of the motor and dust collection subassembly;

FIG. 9 is a fragmentary top perspective view of the rotary cutter subassembly;

FIG. 10 is a top front perspective view of the present jointer/planer in the jointing position; and FIG. 11 is a top rear perspective view of the present jointer/planer in the jointing position.

DETAILED DESCRIPTION OF THE INVENTION

Referring now to FIGS. 1-4 and 9, ;the present jointer/planer is generally designated 10, and includes a machine frame 12 with a front side 14 having a shroud 16 and control switch 18, a rear side 20 opposite the front side and having a fence 22 at an upper end 24. As is known in the art, the fence 22 is pivotable upon a pair of fence brackets 26 from a position parallel to the rear side 20 (as shown) to a position perpendicular to the rear side and projecting away from the rear side.

A board inlet end 28 is opposite a board outlet end 30, however depending on the application, boards may be inserted into the jointer/planer from either end. A jointer bed assembly 32 includes a first jointer bed 34 and a second jointer bed 36, the beds being separated by a rotary cutter 38 (FIG. 9) mounted transversely in the frame 12 and rotatably supported by bearing (not shown) as are known in the art. As is known in the art, the rotating cutter 38 rotates in an axis located transverse to a board feed direction. The fence 22 is located in operational relationship to the jointer beds 34, 36 and the rotary cutter 38 for guiding boards during the cutting operation.

Below the jointer assembly 32 is located a planer bed 40 disposed below the jointer assembly and being vertically adjustable on the frame 12 relative to the jointer assembly. Included in the planer bed 40 is a planer board support platform 42 and at least on extension roller 44 secured to the platform 42 for supporting boards passed across the platform for planing. While only one extension roller 44 is preferred, it is contemplated that in some applications, a second extension roller 46 may be provided extending from an opposite end of the platform. 42 (FIG. 5). As is known in the art, the vertical adjustability of the platform 42 is achieved by a crank 48 connected to a threaded rod 50 (FIG. 11), which threadably engages a threaded aperture (not shown) in a corner of the platform. At the remaining three corners of the platform 42, sleeved threaded slide rods 51 (FIG. 5) pass through sleeves in the platform for guiding the platform as it moves vertically in relation to the rotary cutter 38.

Referring now to FIGS. 2-4 and 9, the rotating cutter 38 includes an axial shaft 52 provided with a pulley 54 driven by at least one drive belt 56 which is in turn driven by a first portion, being a first drive shaft end 58 of a power source 60, preferably an electric motor. The motor 60 is associated with, and preferably connected to the frame 12 so that the first drive shaft end 58 projects through a rear panel 62 of the jointer planer and is thus external of the frame 12. A belt guard 64 removably secured to the rear panel 62 covers the pulley 54, the drive belt 56 and the first drive shaft end 58. In this manner, the drive system for the rotating cutter 38 is accessible for adjustment and/or repair. Also, it will be seen that the motor 60 is located on an opposite side of the planer bed 40 from the jointer beds 34, 36.

Referring now to FIGS. 2 and 4-8, opposite the first drive shaft end 58 of the electric motor 60 is provided a second portion, specifically a second drive shaft end 66. Preferably a second end of the same axial drive shaft or armature passing axially through the motor 60, the drive shaft end 66 is disposed internally on the frame 12 and drives a pulley 68 connected to an impeller 70 connected by at least one impeller drive belt 71 to an impeller shaft 72 which is rotatably supported by bearings 74 in an impeller bracket 76. The impeller bracket 76 is secured to an upper portion 78 of an inverted "U"-shaped inner frame panel 80, the upper portion disposed horizontally when the jointer/planer 10 is mounted conventionally on a shop floor. Thus, the frame panel 80 is part of the frame 12. Also, it will be seen that the motor 60 powers booth the rotary cutter 38 and the impeller 70, and drives the rotary cutter from one of the portions 58, 66, and separately but simultaneously drives the impeller from the other of the portions.

An impeller housing 82 rotatably accommodates the impeller 70, is mounted to the impeller bracket 76 and has a tubular inlet port 84 and an outlet port 86. Upon attachment to the bracket 76, the impeller hosing defines a substantially sealed impeller chamber 88 (FIG. 7). While different lengths are contemplated depending on the application, in the preferred embodiment, the inlet port 84 is longer than the outlet port 86, and is disposed axially relative to the impeller shaft 72.

At least one conduit fitting 90, such as an elbow, is connected between the inlet port 84 and a dust collecting conduit 92 having a first end 94 in fluid communication with the conduit fitting 90. A dust collector hood 96 is disposable on the frame 12 in a first position for jointing (FIGS. 10 and 11), and a second position for planning (FIGS. 1-4). The dust collector hood 96 is constructed and arranged for collecting sawdust and/or wood chips and shavings generated by the rotary cutter 38 during either jointing or planning operation. While different configurations are contemplated, the dust collector hood 96 includes a first hood portion 98 designed for selective mounting to both an upper surface 100 and a lower surface 102 of the jointer beds, 34, 36, depending on whether the jointer/planer is set up for jointing or planning.

Also included in the dust collector hood 96 is a second hood portion 104 connected both to the first hood portion 98 and to a second end 106 of the dust collecting conduit 92. The first and second hood portions 98, 104 are integrally secured to each other during formation or assembly to prevent dust from escaping. As is known in the art, the first hood portion 98 is removably fastened to the jointer beds 34, 36 by hand-operated fasteners 108.

While a variety of shapes, lengths and configurations are contemplated, the dust collection conduit 92 is preferably provided in sufficient length and/or flexibility for maintaining fluid communication between the dust collector hood 96 and the inlet port 84 of the impeller housing 82 regardless of being in a first, jointing position or a second, planning position.

Referring again to FIGS. 2, 4, 7 and 8, and to the impeller housing outlet port 86, an outlet conduit 110 preferably includes an elbow 112 directly connected to the outlet port and an opposite dust outlet 114 constructed and arranged to be in spaced, parallel arrangement with the inlet port 84 and also to project externally of the rear side 20 of the jointer/planer 10, and specifically through respective apertures 116, 118 externally of the rear panel 62, as does the inlet so that the dust outlet and the inlet port 84 are adjacent each other (FIG. 2). It will be seen that upon assembly of the outlet conduit 110 to the outlet port 86, the impeller housing 82 preferably defines a general "U"-shape, with the inlet port 84 being located between the outlet port and the motor 60. Also, it will be seen that the dust collection conduit 92 is connected to the inlet port 84 externally of the frame 12 at the rear side 20 and specifically at the rear panel 62. It is contemplated that other arrangements of the outlet conduit 110 relative to the inlet port 84 may be suitable.

A feature of the present jointer/planer 10 is that the dust collection system 120 (FIG. 7), made up of the impeller 70, the impeller housing 82, the conduit fitting 90, the dust collection conduit 92 and the dust collector hood 96, is powered by the motor 60, which is the same power source as powers the rotary cutter 38. Once a detachable dust collection container 122 is mounted to the dust outlet 114 (FIG. 3), sawdust, wood shavings and/or chips generated by the jointer/planer 10, whether jointing or planning are passed from the dust collector hood 96 to the collection container 122 cleanly and efficiently without the need for a separate vacuum cleaner. Shop floor space requirements are consequently reduced, as are the number of separate shop device power sources, Also, by mounting the dust collection container 122 at the rear side 20 of the frame 12 along with the dust collector conduit 92, the front side 14 and the board inlet and outlet sides 28, 30 are more easily accessible by the user.

While specific embodiments of the present jointer/planer with internal sawdust collection system have been shown and described, it will be appreciated by those skilled in the art that changes and modifications may be made thereto without departing from the invention in its broader aspects and as set forth in the following claims.

What is claimed is:

1. A jointer/planer with an internal sawdust collection system, comprising:
    a machine frame having a board inlet end and a board outlet end;
    a rotating cutter mounted to said frame for rotation in an axis located transverse to a board feed direction;
    a dust collector hood disposable on said frame in a first position for jointing, and a second position for planing;
    a dust collecting impeller disposed in an impeller housing on said frame;
    a conduit having a first end in communication with said hood and a second end in communication with said impeller housing regardless of being in said first position or said second position; and
    a power source associated with said frame and constructed and arranged for powering said cutter and said impeller.

2. The jointer/planer of claim 1, wherein said power source is an electric motor with a drive shaft having a first portion, and a second portion extending from an opposite end of said motor from said first portion, one of said portions powering said cutter and the other of said portions powering said impeller.

3. The jointer/planer of claim 2, wherein said motor drives said cutter from one of said portions, and drives said impeller from the other of said portions.

4. The jointer/planer of claim 2, further including a pulley mounted to each of said portions and having at least one drive belt associated with each said pulley.

5. The jointer/planer of claim 2, wherein said portion powering said cutter is disposed externally of said frame, and said portion powering said impeller is disposed internally on said frame.

6. The jointer/planer of claim 1, wherein said impeller housing includes an impeller chamber and a first port connected to said conduit, and a second port connected forming an outlet, both said first and second ports in fluid communication with said impeller chamber.

7. The jointer/planer of claim 6, wherein said impeller housing is generally "U"-shaped, with said first port being located between said second port and said power source.

8. The jointer/planer of claim 1, wherein said dust collector hood is releasably disposed above a jointer bed when said jointer/planer is configured for planing, and is releasably disposed below said jointer bed when said jointer/planer is configured for jointing.

9. The jointer/planer of claim 1, further including a jointer assembly including a bed on either side of said cutter, and a planer bed disposed below said jointer assembly and being vertically adjustable relative to said jointer bed assembly, said power source being located on an opposite side of said planer bed from said jointer bed assembly.

10. The jointer/planer of claim 1, wherein said frame has a front side having an on/off switch, and a rear side opposite said front side, said rear side having apertures for inlet and outlet ports in fluid communication with said impeller housing and having a drive belt associated therewith connected between said power source and said cutter.

11. The jointer/planer of claim 10, wherein said conduit is connected to said inlet port at said rear side.

12. A jointer/planer with an internal sawdust collection system, comprising:
    a machine frame having a board inlet end and a board outlet end, a first jointer bed disposed on said frame at said board inlet end and a second jointer bed disposed on said frame at said board outlet end, a planer bed disposed on said frame below said jointer beds and being vertically adjustable relative to said jointer beds;
    a rotating cutter mounted to said frame for rotation in an axis located transverse to a board feed direction and disposed between said first and second jointer beds;
    a dust collector hood releasably mountable to said frame in a first position for planing, and a second position for jointing, said dust collector hood having an outlet connected to a first end of a conduit; and
    an impeller chamber having an impeller and an inlet projecting through a rear side of said frame for connection to a second end of said conduit, said impeller chamber also having an impeller outlet projecting through said frame adjacent said inlet.

13. The jointer/planer of claim 12 further including an electric motor having a first drive shaft portion configured for powering said cutter, and a second drive shaft portion configured for powering said impeller.

14. The jointer/planer of claim 13 including drive belts associated with said first and second drive shaft portions for separately driving said cutter and said impeller.

15. The jointer/planer of claim 12 wherein said impeller is located internally in said frame, and said first drive shaft portion projects externally of said frame on said rear side.

16. The jointer/planer of claim 12 further including a dust collection container attachable to said impeller outlet for collecting sawdust and wood shavings generated by operation of said jointer/planer and collected by said dust collector hood.

\* \* \* \* \*